United States Patent Office 2,794,785
Patented June 4, 1957

2,794,785

ANION-EXCHANGE RESINS CROSS LINKED WITH POLYESTER OF UNSATURATED POLYCARBOXYLIC ACID

Gaetano F. D'Alelio, Pittsburgh, Pa., assignor to Koppers Company, Inc., a corporation of Delaware No Drawing. Application March 23, 1953,
Serial No. 344,232

9 Claims. (Cl. 260—2.1)

This invention relates to new anion-exchange resins. More particularly it relates to a process for the preparation of anion-exchange resins having quaternary ammonium hydroxide groups.

Ion exchange resins have been found desirable for a wide variety of commercial uses. For example, such resins are being used in the purification, deionization, or softening of water, the recovery of magnesium from sea water and brine, the recovery of copper and ammonia from waste cuprammonium solutions in rayon plants, the recovery of amino acid from protein hydrolyzates, recovery of certain vitamins from solutions, the separation of fission products obtained from uranium and plutonium, the separation of rare earths, the removal of sodium and copper from oils, the removal of iron and copper from acid liquors, various applications in analytical determinations, and in catalyzing esterification, ester hydrolysis, sucrose inversion, etc., and even for the treatment of peptic ulcers.

Anion-exchange resins used for some of these purposes are disclosed in applicant's U. S. Patent 2,366,008, assigned to the General Electric Company, which comprise aminated copolymers of mono-vinyl-aromatic compounds and divinyl-aromatic compounds, such as prepared by the nitration of an insoluble, infusible styrene-divinyl benzene copolymer followed by reduction of the nitro groups to amino groups. Other anion-exchange resins which are available comprise phenylene diamine-formaldehyde resins, and the phenol-formaldehyde-diethylene-triamine and triethylene-tetramine resins, etc. However, the efficiency of these resins is not sufficiently satisfactory for many anion-exchange purposes.

Ion-exchange resins of great utility, and an advantageous process of preparing them, have now been found, which resins comprise insoluble, infusible resins containing quaternary ammonium groups, the resins comprising polymers having a plurality of units of the formula $$-CH_2-\overset{R}{\underset{\underset{\underset{NR'_3X}{|}}{CH_2}}{\overset{|}{C}}}-$$

wherein R is hydrogen or a methyl or ethyl group; R' is an alkyl or aralkyl group; Z is an arylene or aralkylene group; and X is hydroxyl or halogen; said quaternary ammonium resins being formed by the amination with a tertiary amine of a chloromethylated insoluble, infusible polymer. The insoluble, infusible copolymers of this invention are obtained by the copolymerization of a vinyl aromatic compound with a cross-linking agent which is a polymerizable esterification product of a polyhydric alcohol and an alpha unsaturated alpha, beta-polycarboxylic acid. These polymerizable esterification products can be prepared in accordance with technique now well known to those skilled in the alkyd resin art. Any polyhydric alcohol containing at least two esterifiable aliphatic hydroxyl groups, or mixtures of such alcohols can be used in preparing the polymerizable esterification products useful herein.

Examples of such polyhydric alcohols are ethylene glycol, di-, tri- and tetraethylene glycols, propylene glycol, trimethylene glycol, thiodiglycol, glycerine, pentaerythritol, etc. Any alpha unsaturated alpha, beta-polycarboxylic acid, or mixtures of such acids, can be reacted with the polyhydric alcohol or alcohols to form the unsaturated alkyd resin. Examples of such polycarboxylic acids are maleic, monohalomaleic, fumaric, monohalofumaric, citraconic, mesaconic, acetylene dicarboxylic, aconitic, itaconic and its homologues as for instance alpha methyl itaconic acid, alpha ethyl itaconic acid, alpha alpha dimethyl itaconic acid, etc. If available, anhydrides of these polycarboxylic acids can be employed.

In some cases, instead of using an unmodified unsaturated alkyd resin there can be used a polymerizable unsaturated alkyd resin which has been internally modified by replacing a part, say up to about 75 mol percent, of the unsaturated polycarboxylic acid with a non-ethylenic polycarboxylic acid, e. g., a saturated aliphatic polycarboxylic acid such as succinic, adipic, glutaric, pimelic, sebacic, azelaic, suberic, tricarballylic, tartaric, citric, etc., cyclic polycarboxylic acids, more specifically the saturated cycloaliphatic, polycarboxylic acids such as the cyclopropane dicarboxylic acids, the cyclohexane dicarboxylic acids, the alkyl cycloalkane polycarboxylic acids, etc., and the aromatic polycarboxylic acids, e. g., phthalic, benzoyl phthalic, terephthalic, isophthalic, benzophenone-2,4' dicarboxylic, etc. or with anhydrides of such acids if available.

When the modified or unmodified polymerizable unsaturated alkyd resins are copolymerized with a vinyl aromatic compound, it is advantageous that they be soluble in said vinyl aromatic compound. When copolymerizing a normally liquid vinyl aromatic compound with a "polymerizable esterification product," it is advantageous that the polymerizable esterification product be soluble in the vinyl aromatic compound as this makes possible suspension polymerization which produces beads of the copolymer, a useful form of an ion-exchange resin.

It will be realized that non-resinous polymerizable esterification products, such as glycol dimaleate, can be used to prepare the insoluble, infusible copolymers of this invention. As used herein and in the appended claims "polymerizable esterification product" embraces the non-resinous cross-linking agents described herein, the polymerizable unsaturated alkyd resins as well as the internally modified polymerizable unsaturated alkyd resins.

While various cross-linked copolymers have heretofore been subjected to chloromethylation and subsequent amination to produce quaternary ammonium ion-exchange resins, none have utilized cross-linking agents of the type above described. It is surprising that this cross-linking agent is able to withstand the subsequent chloromethylation and amination steps without degradation of the cross-linkages in the polymer molecule which would undesirably diminish the insolubility and infusibility of the ion-exchange resin.

Various examples of ion-exchange resins prepared by the practice of this invention include polymers which have a plurality of structural units of the following types:

(1) Where Z of the first formula given above is an arylene nucleus, such as phenylene, tolylene, xylylene, naphthylene, vinyl-phenylene, isopropenyl-phenylene, etc.:

(a) 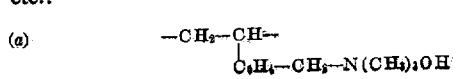

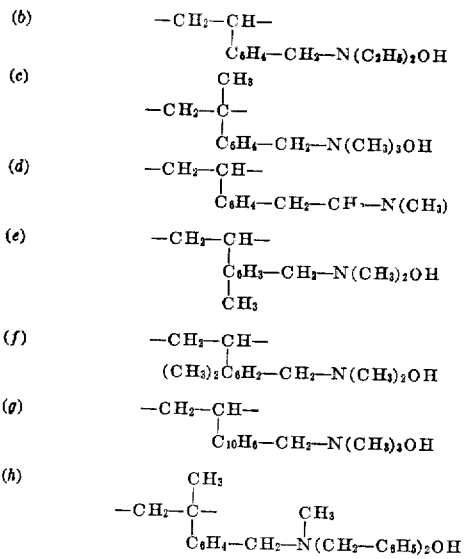

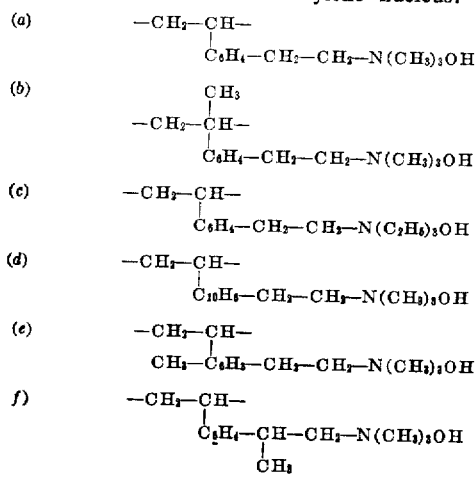

The amount of cross-linking agent copolymerized with a vinyl aromatic compound of the type heretofore described preferably is from 2 to 25% by weight of the vinyl aromatic monomer. The cross-linked copolymers suitable for the practice of this invention can be prepared by any of the common polymerization methods, for example, by mass, solution, emulsion or suspension polymerization. The polymerizations may be advantageously catalyzed by various types of catalysts, such as peroxides, e. g., benzoyl, hydrogen, acetyl, acetyl-benzoyl, phthalyl, lauroyl peroxides, tert-butylhydroperoxide, etc.; other per-compounds, e. g., ammonium persulfate, sodium persulfate, sodium perchlorate, etc.; and in some cases the Friedel-Crafts type catalysts, such as aluminum chloride, advantageously at low temperatures. For example, to mixtures of from 75 to 98 parts vinyl aromatic compound and from 25 to 2 parts cross-linking agent is added 0.25% benzoyl peroxide and the mixture maintained at 80° C. for from 10 to 19 days. The polymerized mass is comminuted and washed with methanol to remove any unreacted monomer. This insoluble, infusible copolymer is then suitable for subsequent chloromethylation and amination as heretofore described to obtain the quaternary ammonium form of the resin. As used herein "parts" and "percent" are by weight unless otherwise indicated.

The chloromethylation of the above-described copolymer can be accomplished by treating the copolymer with formaldehyde and hydrochloric acid or with chloromethyl ether in the presence of a Friedel-Crafts catalyst according to known methods. Lower alkyl tertiary amines are preferred for the amination of the chloromethylated polymer to produce the quaternary ammonium form of the resin.

Monomers which have aromatic nuclei available for substitution and which can be copolymerized with a cross-linking agent as described above to produce insoluble, infusible resins suitable for use in the practice of this invention include vinyl aryls, such as styrene, vinyl naphthalene, vinyl diphenyl, vinyl fluorene, etc., and their nuclear-substituted derivatives such as alkyl, aryl, alkaryl, aralkyl, cycloalkyl, alkoxy, aryloxy, chloro, fluoro, chloromethyl, fluoromethyl, and trifluoromethyl nuclear derivatives, for example methyl-styrenes, e. g., o, m and p-methyl-styrenes, dimethyl-styrenes, o, m and p-ethyl-styrenes, isopropyl-styrenes, tolyl-styrenes, benzyl-styrenes, cyclohexyl-styrenes, methoxy-styrenes, phenoxy-styrenes, o, m and p-chlorostyrenes, o, m and p-fluoro-styrenes, chloromethyl - styrenes, fluoromethyl - styrenes, trifluoro - methyl - styrenes, vinyl - methyl-naphthalenes, vinyl - ethyl - naphthalenes, vinyl - chloro - naphthalenes, vinyl-methyl-chloro-naphthalenes, etc. Other aromatic monomers which can also be used include aromatic compounds having a vinyl group containing an alkyl group in its alpha position, e. g., isopropenyl or alpha-methyl-vinyl, alpha-ethyl-vinyl, etc. Such alpha-alkyl-vinyl groups may be substituted on benzene, naphthalene, diphenyl, fluorene nuclei, etc., and may have other substituents on the aromatic nuclei as illustrated above for the vinyl aryl compounds. For ease of polymerization, the alpha-alkyl group is advantageously methyl or ethyl. When the alpha-alkyl-vinyl type of aromatic monomer is used as a copolymerizing monomer, ionic-type polymerization catalysts may be used advantageously.

The following examples are illustrative, but not limitative, of the invention.

EXAMPLE I

Cross-linked copolymers in bead form are prepared by suspension polymerization in an autoclave by the following procedure.

To 95 parts styrene are added 5 parts of polymerizable esterification product A (see Table 1). To this mixture there is added 0.18 part benzoyl peroxide and 0.05 part t-butyl perbenzoate. This material is added to the autoclave together with 200 parts distilled water, 300 parts hydroxy apatite and 0.03 part sodium oleate.

*Table 1*

| Polymerizable Esterification Product | Composition |
|---|---|
| A | ethylene glycol (23 parts) and itaconic acid (52 parts). |
| B | diethylene glycol (106 parts) and itaconic acid (130 parts). |
| C | glycerine (18.4 parts) and itaconic acid (26 parts). |
| D | ethylene glycol (62.05 parts), itaconic acid (32.51 parts) and phthalic anhydride (111.03 parts). |
| E | glycerine (20 parts), itaconic acid (29 parts) and pthalic anhydride (11 parts). |
| F | diethylene glycol (20 parts), itaconic acid (18.2 parts) and succinic acid (7.08 parts). |
| G | ethylene glycol (20 parts), maleic anhydride (29.4 parts) and succinic acid (3.3 parts). |
| H | diethylene glycol (30.6 parts), maleic anhydride (17.6 parts) and itaconic acid (15.6 parts). |
| I | glycerine (18.4 parts) and maleic anhydride (29.4 parts). |
| J | diethylene glycol (30.3 parts), maleic anhydride (13.2 parts) and phthalic anhydride (21.7 parts). |
| K | glycerine (25.76 parts), maleic anhydride (13.72 parts) and phthalic anhydride (20.72 parts). |
| L | ethylene glycol (18 parts) and maleic anhydride (27.4 parts). |
| M | diethylene glycol (160 parts) and maleic anhydride (147 parts). |
| N | ethylene glycol (18 parts) and maleic anhydride (56.9 parts). |

The autoclave is then closed and agitated by a rocking mechanism while the autoclave is immersed in a controlled-temperature bath at 90° C. for 10 hours and then at 113–115° C. for 5 hours. In each case, the resultant copolymer beads are washed with dilute HCl, then with water, and subsequently dried at 70° C. for about two hours. There are obtained insoluble, infusible copolymer beads.

Fifty parts of these copolymer beads are chloromethylated by reaction with approximately 200 parts of chloromethyl ether in the presence of approximately 25 parts zinc chloride catalyst. The reaction is carried out at 15–40° C. for approximately 5 hours. The chloromethylated resin is separated by filtration, washed with methyl ethyl ketone, then with water.

The chloromethylated resin is suspended in toluene and treated with 500 parts trimethyl amine in a pressure vessel at a temperature of approximately 50° C. for approximately 10 hours. There is obtained the quaternary ammonium chloride form of the resin. The resin is separated by filtration and washed with a small volume of a volatile organic solvent such as diethyl ether. Upon treatment of this resin with approximately ⅓ normal sodium hydroxide solution, there is obtained the quaternary hydroxide form of the resin.

In the preceding example the styrene can be replaced by one or more of the vinyl aryl compounds previously mentioned. Similarly, the various polymerizable esterification products set out in Table 1 can be used in place of polymerizable esterification product A. There are obtained in each instance insoluble, infusible copolymer beads.

EXAMPLE II

One hundred parts by weight of the resin of Example I is wet with 50 parts by weight of distilled water, and then 100 parts by weight of a standardized hydrochloric acid solution is added with shaking. After the resin and the solution have been in contact for about 15 minutes, the solution is separated from the resin by filtration. The filtrate solution is then titrated with sodium hydroxide to determine the amount of hydrochloric acid still in solution. If the filtrate solution has been completely neutralized by the resin, the procedure is repeated using a larger amount of the hydrochloric acid solution with a fresh sample of the resin. The efficiency of the resin is determined by calculating the ratio of chloride ions actually removed from the solution to the chloride ions theoretically removable. A good efficiency is indicated by these calculations.

EXAMPLE III

The exhausted resin of Example II is regenerated by treatment with about ⅓ normal sodium hydroxide solution. After the solution is removed by filtration the resin is washed well with distilled water and retested for its anion-adsorption capacity according to the above-mentioned procedure. The efficiency after regeneration approximates the original capacity of the resin.

The quaternary ammonium hydroxide resins of this invention are very efficient anion-adsorption agents due very likely to the highly basic character of the quaternary ammonium hydroxide groups. Other anions which may be removed from solution by the water-insoluble polymers of this invention, in addition to the chloride anions previously mentioned, include nitrate ions, sulfate ions, acetate ions, oxalate ions, tartrate ions, or any other anions which will react with the basic quaternary ammonium hydroxide groups in the resin to form insoluble salts. Apparently because of the highly basic character of the quaternary ammonium hydroxide groups, these resins are more efficient than the previously used amine-type anion-exchange resins. These anion-exchange resins can be readily regenerated by washing with a dilute alkali solution, preferably of an alkali-metal hydroxide which forms soluble salts with the adsorbed anions.

Resins containing a plurality of units set forth in column 1 in which Z is an aralkylene group can be prepared by starting with an insoluble, infusible copolymer of a vinyl aromatic compound and a cross-linking agent, for example, polymerizable esterification product B, and reacting this resin with an alpha-omega-dihalo-alkane in the presence of a Friedel-Crafts catalyst. Thus, for example, an insoluble, infusible copolymer of from 75 to 98 parts styrene and from 25 to 2 parts polymerizable esterification product B can be reacted with ethylene dichloride in the presence of a Friedel-Crafts catalyst, such as aluminum chloride, to chloroethylate the aromatic nuclei. This chloroethylated resin can be aminated with a tertiary amine as above described to produce the quaternary ammonium chloride form of the resin. Similarly, there can be used other alpha-omega-dihalo-alkanes in place of the ethylene chloride above used to obtain a variety of halo-alkylated resins which can subsequently aminated as above described. Preferably, the alpha-omega-dihalo lower alkanes, that is, normal alkanes containing less than 9 carbon atoms, are used to produce structures in which Z is an aralkylene group.

While in the foregoing examples there has been illustrated the preparations of copolymers containing 5 parts of cross-linking agent, it is to be understood the proportions of vinyl aromatic monomer and cross-linking agent can be varied over a wide range without departing from the spirit of this invention. As heretofore stated, the preferred resins are copolymers containing from 75 to 98 parts vinyl aromatic monomer and from 25 to 2 parts cross-linking agent.

Inert material, such as diatomaceous earth, Alundum, coke, silica, cinders, porous glass, etc., may be used as a carrier for the resins in order to increase the effective surface of the resin for ion exchange. These carriers may be introduced by adding them any time prior to complete polymerization of the monomers to an insoluble, infusible state. An emulsion or dispersion type of polymerization is advantageous for the coating of such carrier materials with the resin.

The invention as hereinabove set forth is embodied in particular form and manner but may be variously embodied within the scope of the claims hereinafter made.

The invention claimed is:

1. An insoluble, infusible resin comprising a copolymer having a plurality of repeating units having the structure

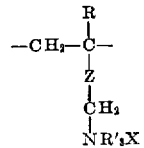

wherein R is a member of the class consisting of hydrogen and methyl and ethyl groups; R' is a member of the class consisting of alkyl and aralkyl groups; Z is a member of the class consisting of arylene and aralkylene groups; and X is chosen from the class consisting of hydroxyl and halogen, and in which said copolymer contains a plurality of cross-linkages resulting from copolymerization with a polymerizable esterification product of a polyhydric alcohol and an alpha unsaturated alpha, beta-polycarboxylic acid, said polymerizable esterification product being present in the copolymer molecule in an amount of from 2 to 25 parts by weight of the copolymer molecule.

2. A resin of claim 1 in which Z is phenylene and in which the polymerizable esterification product is present in the copolymer molecule in an amount of from 2 to 25 parts by weight of the copolymer molecule.

3. An insoluble, infusible copolymer of from 75 to 98 parts styrene and 2 to 25 parts polymerizable esterification product of a polyhydric alcohol and an alpha unsaturated alpha,beta-polycarboxylic acid, said resin containing, attached directly to the aromatic nuclei of said copolymer, a plurality of groups of the general formula —CH₂—NR'₃X in which R' is a member of the class consisting of alkyl and aralkyl groups and X is chosen from the class consisting of hydroxyl and halogen.

4. An insoluble, infusible copolymer of 95 parts styrene and 5 parts polymerizable esterification product of a polyhydric alcohol and an alpha unsaturated alpha-beta-polycarboxylic acid, said resin containing, attached directly to the aromatic nuclei of said copolymer, a plurality of groups of the general formula —$CH_2$—$NR'_3X$ in which R' is a member of the class consisting of alkyl and aralkyl groups and X is chosen from the class consisting of hydroxyl and halogen.

5. The method of treating liquid media to remove anions therefrom which comprises contacting said media with an insoluble, infusible resin comprising a copolymer having a plurality of repeating units of the structure

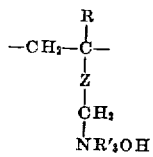

wherein R is a member of the class consisting of hydrogen and methyl and ethyl groups; R' is a member of the class consisting of alkyl and aralkyl groups; and Z is a member of the class consisting of arylene and aralkylene groups, and in which said copolymer contains a plurality of cross-linkages resulting from copolymerization with a polymerizable esterification product of a polyhydric alcohol and an alpha unsaturated alpha,beta-polycarboxylic acid, said polymerizable esterification product being present in the copolymer molecule in an amount of from 2 to 25 parts by weight of the copolymer molecule.

6. The method of claim 6 in which Z is phenylene and the polymerizable esterification product is present in the copolymer molecule in an amount of from 2 to 25 parts by weight of the copolymer molecule.

7. The method of claim 6 in which the polymerizable esterification product is present in the copolymer molecule in an amount of 5 parts by weight per 100 parts by weight of copolymer.

8. The method of treating liquid media to remove anions therefrom which comprises contacting said media with an insoluble, infusible resin comprising a copolymer of from 75 to 98 parts styrene and from 2 to 25 parts polymerizable esterification product of a polyhydric alcohol and an alpha unsaturated alpha,beta-polycarboxylic acid, said copolymer containing attached to its aryl nuclei a plurality of groups of the formula —$CH_2$—$NR'_3OH$ in which R' is a member of the class consisting of alkyl and aralkyl groups.

9. The method of claim 8 in which the copolymer contains 95 parts by weight styrene and 5 parts by weight polymerizable esterification product.

References Cited in the file of this patent

UNITED STATES PATENTS

| | | |
|---|---|---|
| 2,202,846 | Garvey et al. | June 4, 1940 |
| 2,255,313 | Ellis | Sept. 9, 1941 |
| 2,591,573 | McBurney | Apr. 1, 1952 |
| 2,597,440 | Bodamer | May 20, 1952 |
| 2,609,228 | Thomas | Sept. 14, 1954 |

UNITED STATES PATENT OFFICE

CERTIFICATE OF CORRECTION

Patent No. 2,794,785                          June 4, 1957

Gaetano F. D'Alelio

It is hereby certified that error appears in the printed specification of the above numbered patent requiring correction and that the said Letters Patent should read as corrected below.

Column 3, line 12, for that portion of the formula reading "$C_6H_3\text{-}CH_2\text{-}N(CH_3)_2OH$" read --$C_6H_3\text{-}CH_2\text{-}N(CH_3)_3OH$--; column 6, line 14, after "can" insert --be--; column 8, lines 3 and 7, for "claim 6", each occurrence, read --claim 5--.

Signed and sealed this 1st day of October 1957.

(SEAL)
Attest:
KARL H. AXLINE
Attesting Officer

ROBERT C. WATSON
Commissioner of Patents